United States Patent [19]

Miller

[11] Patent Number: 4,729,828

[45] Date of Patent: Mar. 8, 1988

[54] MODULAR ROTATING BIOLOGICAL CONTACTOR SYSTEM

[76] Inventor: Gary Miller, 4931 E. 300 North, Lafayette, Ind. 47905

[21] Appl. No.: 59,008

[22] Filed: Jun. 8, 1987

Related U.S. Application Data

[63] Continuation-in-part of Ser. No. 946,923, Dec. 29, 1986, abandoned.

[51] Int. Cl.$^4$ .............................................. C02F 3/08
[52] U.S. Cl. .................................... 210/150; 210/232
[58] Field of Search ............... 210/619, 150, 151, 232, 210/251

[56] References Cited

U.S. PATENT DOCUMENTS

| | | | |
|---|---|---|---|
| 3,389,798 | 6/1968 | Hartmann et al. | 210/151 X |
| 3,466,241 | 9/1969 | Simpson | 210/151 X |
| 3,630,366 | 12/1971 | Joost | 210/150 |
| 3,837,492 | 9/1974 | Di Belle | 210/150 |
| 3,886,074 | 2/1975 | Prosser | 210/150 |
| 4,207,190 | 6/1980 | Sheaffer | 210/232 |
| 4,211,647 | 7/1980 | Friedman et al. | 210/150 X |
| 4,251,370 | 2/1981 | Stenglin | 210/150 |
| 4,431,537 | 2/1984 | Hirota | 210/150 |
| 4,444,658 | 2/1984 | Hankes et al. | 210/232 X |

Primary Examiner—Tom Wyse
Attorney, Agent, or Firm—Hill, Van Santen, Steadman & Simpson

[57] ABSTRACT

A modular rotating biological contactor apparatus is provided which utilizes a plurality of hemicylindrical trough sections, a plurality of bulkhead means interconnecting adjacent trough sections, and a pair of endplate means. These components are prefabricated and adapted for simple and easy interconnection therebetween thereby to provide from a relative small number of subassemblies a plurality of different configurational possibilities for rotating biological contactor apparatus.

13 Claims, 14 Drawing Figures

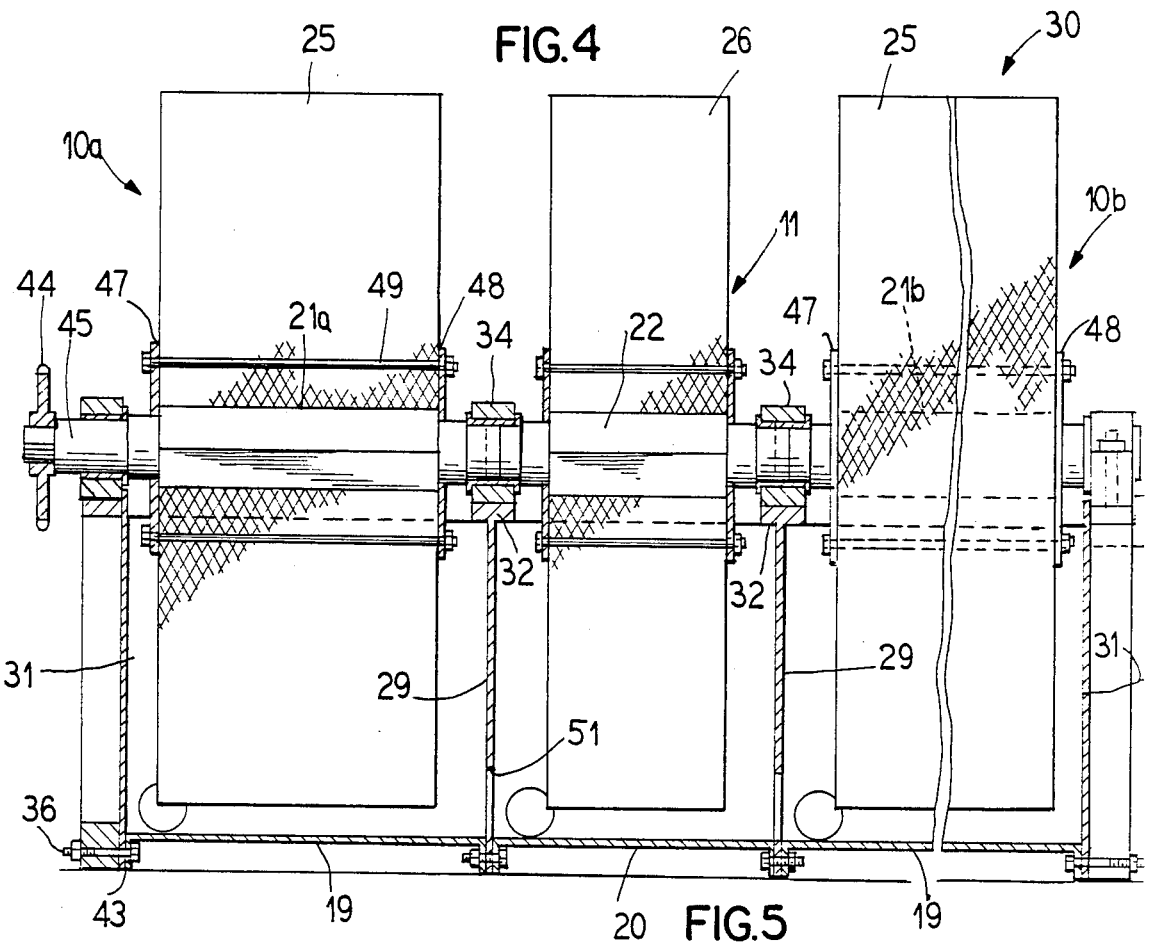
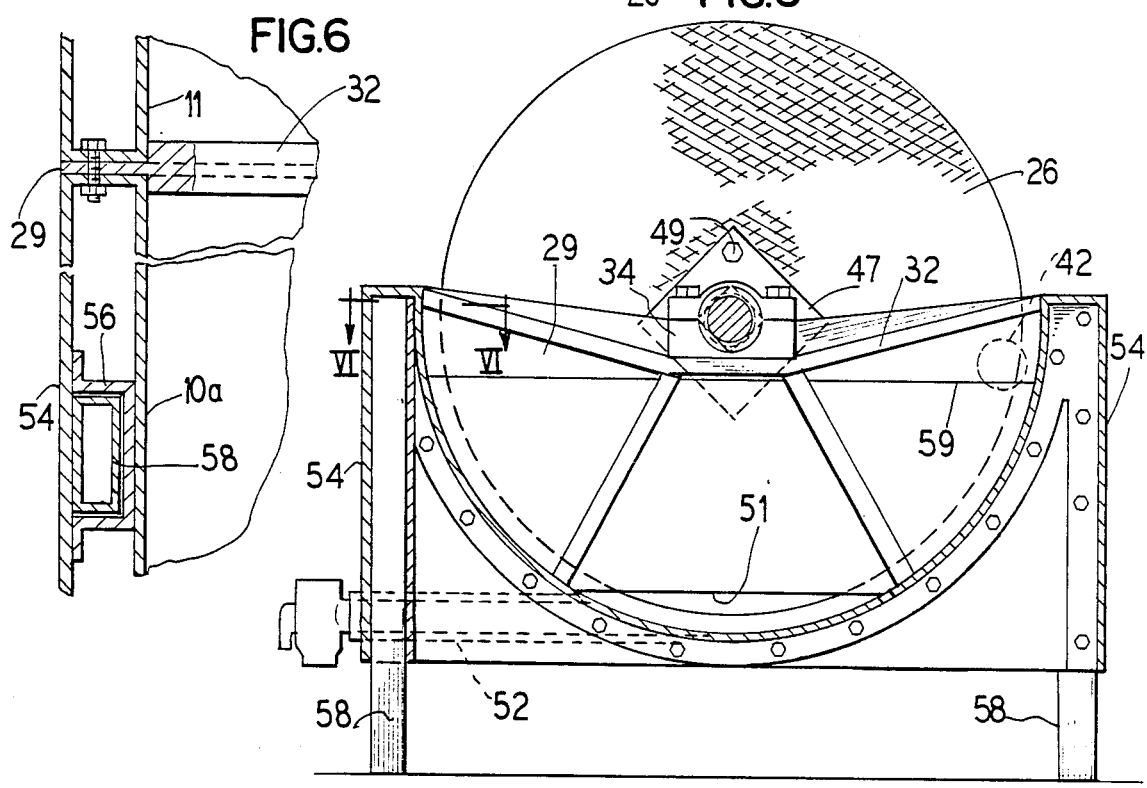

MODULAR ROTATING BIOLOGICAL CONTACTOR SYSTEM

RELATED APPLICATION

This application is a continuation-in-part of my previously filed U.S. patent application Ser No. 946,923 filed Dec. 29, 1986, now abandoned.

BACKGROUND OF THE INVENTION

1. Field of the Invention

This invention lies in the field of rotating biological contactors, particularly modular tankage systems for such apparatus.

2. Prior Art

Rotating biological contactors are used for the biological treatment of wastewater. Such a device characteristically utilizes a wastewater contacting medium which is fixed upon a rotatable shaft and arranged to continuously revolve in a reservoir of wastewater to be treated. In an aerobic such device, as the contacting medium rotates, the medium experiences alternatively exposure to wastewater and then to oxygen (air). A biological culture develops on the medium which has capability for digestion of substrates in the wastewater.

The rotating biological contactors has only been used in the United States since the early 1960's. The state of the art is presented in such publications as "Fixed Biological Surfaces—Wasterwater Treatment" by R. L. Antonie (CRC Press, 1976), "Biological Wastewater Treatment Theory and Application" by C. P. L. Grady, Jr., and H. C Lim (Marcel Dekker, Inc., 1980), and the "Proceedings: First National Symposium/Workshop on Rotating Biological Contactor Technology" edited by E. D. Smith, R. D. Miller, and Y. C. Wu (Army Corp. Engineers, USEPA, and University of Pittsburgh, 1980).

Currently, what is believed to be the most common commercially available form for a rotating biological contactor apparatus utilizes a single, horizontally rotatable shaft about 25 feet long which carries contacting media having a gross diameter of about 12 feet and which media provide a total of about 100,000 square feet of surface area. Commonly, such one shaft extends through a multiplicity of axially aligned stages or chambers (typically from 3 to 6 stages) and the contacting media are so distributed along the shaft as to locate portions thereof in each stage. Such a type or form of rotating biological contactor apparatus is also commercially available in a plurality of other sizes from various manufacturers. Thus, arrangements are believed to be commercially available wherein the diameters of the contacting media range from about 4 to 12 feet, and the number of individual stages in such apparatus ranges upwards from one.

Commonly, the tankage portion of a conventional large commercial apparatus is locally designed and built to accomodate a rotating contactor and associated shaft subassembly purchased from some manufacturer. Such a tankage portion is commonly fabricated on site of poured concrete. However, in all known commercial forms of such a rotating biological contactor apparatus the tankage portions are individually designed and manufactured either to order, or as packaged assemblies, and all such apparatus embodiments are either fixed, or are characterized by having very limited variablity, in operational configuration. The stationary components are dimensionally fixed.

Another type of commercially available rotating biologioal contactor apparatus employs a plurality of contactor/shaft assemblies wherein the shafts are in generally spaced, parallel relationship to one another with each shaft being supported over a separate but adjacent operational stage of a stage plurality with the stages arranged in a side-by-side manner. Here, no variation whatever in this fixed relationship between components, especially the stationary tankage components, appears to be possible once a given such apparatus embodiment is in place.

Particularly because of the many variations in application situations, a need has developed in the field for a type of rotating biological contactor apparatus which can be rapidly, simply reliably and inexpensively assembled, modified, and/or expanded even after an initial installation has been completed and operated. A plurality of various potential apparatus configurations would be desirable using the same subcomponents for assembly. The capability for using the same apparatus subcomponents in the assembly of a variety of different rotating biological contactors would, if available, offer many practical advantages, especially for treating a variety of wastewaters, such as, for example, those having (a) a relatively low level of pollutants, (b) a relatively low flow characteristic, and (c) a relatively significant compositioned change (by comparison to an initial compositioned condition).

BRIEF SUMMARY OF THE INVENTION

This invention relates to improved rotating biological contactor apparatus, and, more particularly, to rotating biological contactor apparatus comprised of modular components.

The present invention provides a class of modular units or subassemblies which permits various combinations of such modular units to be assembled together as desired by a user in a simple, effective, and reliable manner to provide modular rotating biological contactor apparatus capable of assembled, reassembled, modified, expanded, or the like.

The invention thus provides in one aspect the capability of providing an assembled rotating biological contactor apparatus adapted to meet the particular demands and needs associated with an individual use situation.

The invention further provides in another aspect a group of interconnecting and cooperating subassemblies which coact together to provide a plurality of different apparatus configurations thereby to achieve a new and improved class of rotating biological contractor systems.

Another object is to provide maximum of flexibility and variability in apparatus configuration and construction in a rotating biological contactor with a minimum number of components.

Another object is to provide a modular rotating biological contactor system which is easy to use, assemble, and maintain, and which is reliable, economical, and well adapted for usage in substantially all situations where modular rotating biological contactor apparatus can be employed for wastewater treatment.

Another object is to provide rotating biological contactor apparatus which is particularly well suited for use in pilot studies and the like of the type wherein rotating biological contactor apparatus can be varied in structural configuration, thereby to increase the capability and capacity to fine-tune a given installation design, or the like, as those skilled in the art will appreciate.

Another object is to provide in rotating biological contactor apparatus the capability for providing a modifiable system wherein the system can be structurally altered or adjusted, including expanded, so that, as, for example, a given community wastewater treatment problem changes through community growth, through industrial growth, or the like, the initial rotating biological contactor apparatus can be expanded and/or modified without having to replace the entire original rotating biological contactor apparatus, thereby achieving economies.

Another object is to provide the capability for a community to build a wastewater purification plant incorporating a rotating biological contactor whose design is such that the immediate needs of the community can be met with a particular chosen treating plant at a particular contemporary cost while yet preserving the capacity of that community to expand that plant to meet future changed community needs at a later date without having to build an entire new plant, thereby reducing initial installation costs, operational costs, and even subsequent alteration costs.

Other and further objects, aims, purposes, features, advantages, aspects, embodiments, and the like will be apparent to those skilled in the art from the teachings of the present specification taken with the accompanying drawings.

BRIEF DESCRIPTION OF DRAWINGS

In the drawings:

FIG. 4 is longitudinal sectional view taken along the line IV—IV of FIG. 2;

FIG. 5 is a transverse sectional view taken along the line V—V of FIG. 4;

FIG. 6 is an enlarged fragmentary transverse sectional view taken along the line VI—VI of FIG. 5;

DETAILED DESCRIPTION

Figure 1:
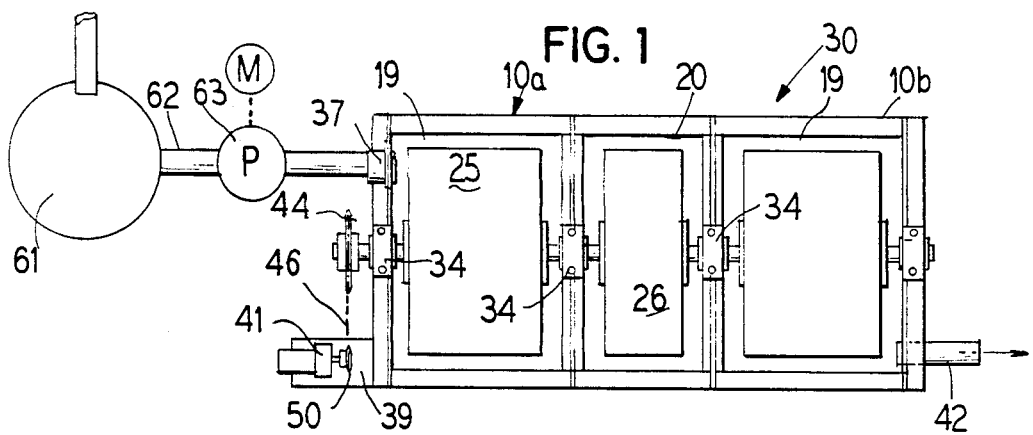
FIG. 1 is a top plan view of one embodiment of a modular rotating biological contactor apparatus of the present invention.
Figure 2:
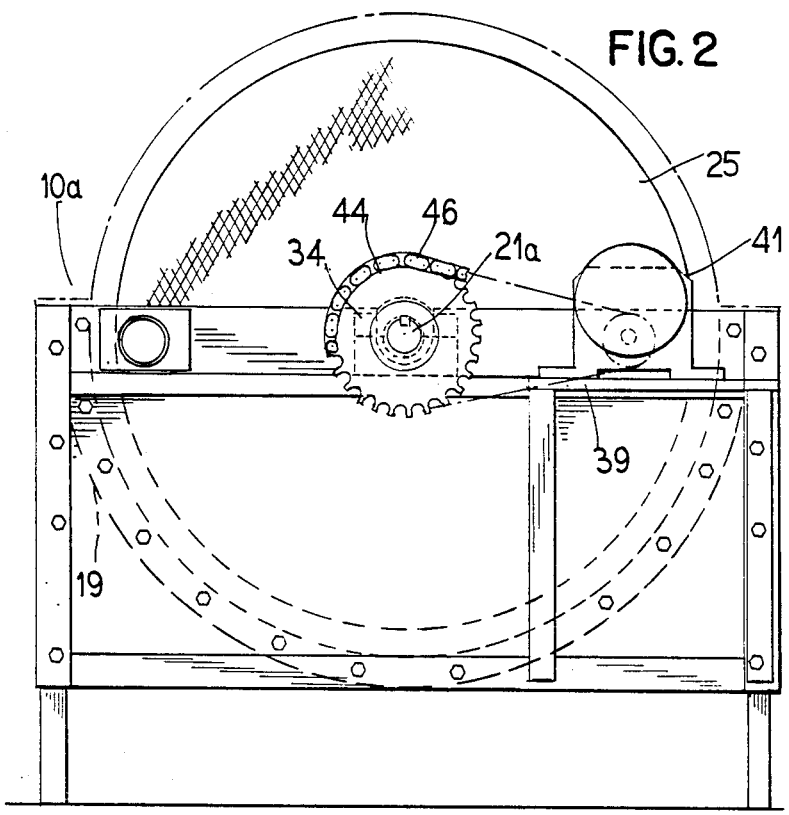
FIG. 2 is a side elevational view taken along the line II—II of FIG. 1, some parts thereof broken away and some parts thereof shown in section.
Figure 3:
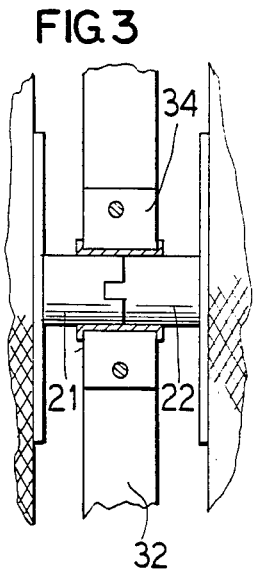
FIG. 3 is an enlarged fragmentary vertical sectional view taken along the line III—III of FIG. 1.

In FIGS. 1-7, there is seen an embodiment 30 of a modular rotating biological contactor apparatus of the present invention. Embodiment 30 is comprised of modular subassemblies which in embodiment 30 are combined to provide two different sizes of modular repeating units or stages, one such unit being identified by the numeral 10, and the second unit by the numeral 11 (see, for example, FIG. 1). Two similar modular units, identified as 10a and 10b respectively in the embodiment 30, serve as the opposite end assemblies thereof, while the modular unit 11 serves as a single intermediate assembly.

Modular unit combinations for any given embodiment of a modular rotating biologioal contactor apparatus can vary in the sequence arrangement of individual such units. Also, individual units can vary in longitudinal length. The unit combination selection employed in any given embodiment is influenced or controlled by use considerations, projected operational variables, and the like. For an embodiment 30, exemplary suitable dimensions for modular unit 10 can include an axial length of about four feet, while the corresponding axial length for the modular unit 11 can be about 2 feet, although longer and shorter dimensions can be used if desired. The inside diameter of units 10 and 11 can be approximately four feet, although diameters up to about eight feet or even larger can be used if desired. When smaller units are desired, modular unit sizes down to about six inches in diameter and in axial length appear to be practical for certain purposes, such as for laboratory (experimental) purposes, pilot operations, and the like, as those skilled in the art will appreciate. No particular criticality is believed to be associated with the unit dimensions of individual units employed in an apparatus embodiment; however, the overall dimensions of a given contactor embodiment are taken into account in designing an embodiment to meet the needs of a particular application situation, as those skilled in the art will readily appreciate.

Each modular unit, such as a unit 10 or 11, can be regarded as including a hemicylindrical trough section identified as 19 for each of units 10a and 10b, and as 20 for unit 11, respectively, as well as plate (or bulkhead) means.

A shaft section with a cross-sectionally flat sided configuration (for example, square) central region is here illustratively and preferably employed for each respective modular unit. Thus, in the case of, for example, modular units 10a and 10b, a shaft 21 is employed, while a shaft 22 is employed for unit 11. A circular contactor 25 is provided for units 10a and 10b while a contactor 26 is provided for unit 11. Contactor 25 differs from contactor 26 in axial length with contactor 25 being somewhat greater in axial length than contactor 26. Each contactor 25 and 26 is mounted centrally and axially on its respective shaft 21 and 22.

Each of the contactors 25 and 26 can be of conventional structure and can be of a type which is known to those skilled in the art of rotating biological contactors. In general, such a circular contactor has a high surface area.

Many different contactor structures and arrangements are known to the prior art, and, so far as is now known, all such contactors, if desired, are adaptable for use in the apparatus of the present invention. For examples, the spiral wrap contactor assembly shown in U.S. Pat. No. 4,532,035 can be employed. Also, the disk type contactor of U.S. Pat. No. Re. 29,970 can be employed. Corrogated-type contactor media constructions can be employed. The fixed shell type with internal movable elements, such as available commercially under the trademark "Bio-Sphere", can be used. The plate or disk and segment type of contactor assemblies can be employed, such as disclosed in U.S. Pat. No. 4,608,162. A present preference is to employ a contactor having a high surface to volume ratio. For example, for soluble BOD removal from influent charged to a rotating biological contactor, a conventional surface area for a contactor is suitable, such as a surface are of approximately 35 square feet/cubic feet for a first stage. In later stages, the surface area can be 50 or more square feet/cubic feet to accomodate nitrification. In such an arrangement, the unit 11 can serve as the first unit in a series of units comprising an embodiment (not shown) which two succeeding stages of unit 10 can be used.

Each modular unit 10 and 11 further includes an intermediate baffle or bulkhead 29 which is similarly constructed for each respective units 10 and 11. Also included is a pair of terminal bulkheads or endplates 31. The bulkhead 29 functions as a diaphram or wall between a pair of longitudinally adjacent units, such as units 10 and 11 in embodiment 30, and, for such purposes, the bulkhead 29 can have a relatively thin wall since the fluid pressures occurring in operation of embodiment 30 on opposite sides of a bulkhead 29 tend to be equal as those skilled in the art will appreciate Thus, each hemicylindrical trough section, such as troughs 19 or 20, in combination with the bulkheads associated with opposite ends thereof defines a chamber with hemicylindrical sides. Each chamber in combination with the contactor, such as contactor 25 or 26 as the case may be, defines a single stage or zone in a rotating biological contactor apparatus, such as embodiment 30.

When an apparatus embodiment, such as, for instance, embodiment 30, is being assembled, two separate endplates or bulkheads 31, one for each end of embodiment 30, are used. Conveniently, such are supplied as components of a complete but disassembled "kit" for a single complete rotating biological contactor apparatus which the user desires to construct and/or operate. Also, such a "kit" includes the needed quantities of troughs 19 and/or 20, and of intermediate bulkheads 29. The quantity of bulkhead 29 is equal to one less than the total number of trough sections 19 and 20 utilized in a single complete contactor apparatus.

Each bulkhead 29 or 31 in the embodiment 30 is generally rectangularly configured in side elevational view. Those skilled in the art will appreciate that the size of a given embodiment 30 can vary. In an intermediately sized contactor apparatus, such as is shown and illustrated in embodiment 30, each bulkhead 29 or 31 is preferably but optionally provided with an integrally formed and incorporated brace structure which is designated in its entirety in the case of a bulkhead 29 by the numeral 32 and in the case of an endplate 31 by the numeral 33, respectively. These brace structures 32 and 33 each function as a load bearing member or platform support for individual respective bearings 34 which rest preferably centrally upon and over the underlying wall portions of respective bulkheads 29 and 31.

Thus, and for example, each trough section 10 at an opposite end region of a given contactor apparatus, such as embodiment 30, is functionally associated with a different endplate 31 to provide an outside endwall therefor. To mount an endplate 31 against the (open) end of a trough section, such as 10a, a plurality of nut and bolt assemblies 36 are here employed (see, for example, FIG. 7), although any suitable engaging means (preferably including sealing means which is not shown) can be employed, thereby to provide a preferably water tight engagement between the end of the trough section 10a and the associated endplate 31. In the endplate 31 which is positioned on the input end of the assembled contactor apparatus of embodiment 30, an input pipe 37 is associated along with an aperture, not shown, in endplate 31. In embodiment 30, pipe 37 feeds input fluid near the top edge of plate 31. The reinforcing, perimeter-located endplate brace structures 33 are integrally associated with the endplate 31 by any convenient means. For example, the endplate 31 and the brace structure 33 can be enmeshed in and covered by glass filled polyester resin. Also, conveniently and preferably, a platform 39 for supporting a motor/reducer drive unit 41 (conventional) is provided for the input end with the platform 39, the platform 39 being conveniently associated with the brace structure 33 as shown, for example, in FIG. 7. The endplate 31 employed at the discharge (output) end of the contactor apparatus of embodiment 30 is similarly associated with an output pipe 42 (and operture, not shown). In embodiment 30, the pipe 42 is located near the upper side edge thereof, as shown, for example, in FIG. 7.

In embodiment 30, the bulkhead 29 is mounted against each one of the adjacent trough sections 10a and 11, and 11 and 10b respectively, by nut and bolt assemblies extending through integrally formed, internally projecting, transversly extending flanged portions 43 which are associated with each axially opposed end portion of each trough section, such as trough sections 10 and 11. Each pair of the adjacent flanged portions 43 of a trough section 10 are adapted to be adjacent to the corresponding flanged portions 43 of adjacent trough section 11. The various apertures 27 are arranged so as to be alignable with the various pertures 28 formed peripherally around the side and bottom edges of each bulkhead 29, thereby to permit such bolt and nut assemblies to extend through the three aligned sets of apertures in an embodiment 30 so as to secure these respective components together. Conveniently and preferably, sealing means (not shown) is provided between each trough section 10 or 11 and the adjacent associated baffle or bulkhead 29.

Once an assembled arrangement of both endplates 31, trough sections 10a and 10b, trough section 11, and bulkheads 29, is achieved, then each preassembled subassembly comprised of the contactors 25 and 26 with their associated respective shaft segments 21a, 21b and 22 are set into their respective modular units 10 and 11. The individual shaft segments have respective opposite end portions each of which rests upon a respective bearing block 34 as shown. As those skilled in the art will appreciate, those portions of the respective shafts 21a, 21b and 22 which engage the bearing blocks 34 are circular in cross section. The above referenced square central sections of the respective shaft sections or segments 21a, 21b and 22 functionally serve for keying and stablizing the respective contactors 25 and 26 thereupon.

Preferably, and as shown, the bearing blocks 34 are of the axially split type, thereby permitting the top half 34 of each bearing block 34 to be disassembled from the bottom half 34 thereof for easy assembly and disassembly of the contactors 25 and 26 from the units 10 and 11. As shown, for example, in FIG. 3, abutting end portions of each of the respective shaft segments 21a, 21b, and 22 are provided with axially projecting tongue and groove portions which are adapted to matingly interengage with one another, thereby to provide a drivable interconnecting relationship between each coaxially aligned pair of adjacent shaft segments, such as shaft segments 21a and 22. Thus, a single interengaged sequence of and of the shaft segments 21a, 21b, and 22 can be end driven from a single powerhead for rotating all of the contactors 25 and 26 in the assembled embodiment 30. Any convenient shaft coupling arrangement, or powerhead coupling arrangement, can be employed as those skilled in the art will readily appreciate.

It is advantageous, and also a preferred feature of an embodiment 30, that an individual shaft segment (and its associated contactor) can be removed from embodiment 30 without disrupting or disassembling the remainder of the assembled components comprising embodiment 30. Such a removal can be necessary or desirable for accomplishing various purposes, such as equipment inspection, routine maintenance, repair, part replacement, or the like, as those skilled in the art will appreciate. In this embodiment 30, all of the contactors 25 and 26 are rotatably driven from a single driven power input sprocket 44 which is associated with an exposed terminal end portion of one composite shaft assembly, such as the exposed end 45 of shaft segment 21b (see FIG. 4). Sprocket 44 is, in turn, here conveniently associated with a roller drive chain 46, and the chain 46, in turn, engages the drive sprocket 50 of the motor reducer drive unit 41, as shown for example, in FIG. 1.

In the illustrative contactors 25 and 26, to provide and achieve axial positioning of a contactor, such as contactor 25, upon its associated shaft segment, such as shaft segment 21a, a pair of retaining endplates are provided, such as plates 47 and 48, which mount over the square central portion of shaft segment 21a and which are fixed relative to one another by means of elongated nut and bolt assemblies 49 that extend longitudinally along shaft segment 21a between the respective plates 47 and 48 through the body of contactor 25. Similar plate and nut and bolt assemblies are provided for the contactor 26 relative to its shaft segment 22.

In order to provide a flow path from the interior of one unit, such as unit 10 in embodiment 30, into the interior of an adjacent unit, such as unit 11, an aperture 51 is provided which is here located in a lower portion of each bulkhead 29, as shown in embodiment 30.

Optionally, for unit clean-out, draining capability or the like, a drain tube 52 can be provided in functional association with a bottom location of each respective trough section, such as sections 19 and 20. A suitable conventional shutoff valve (not shown) is conveniently mounted in the tube 52, as those skilled in the art will readily appreciate.

As a matter of convenience, for the assembly and operation of a given unit 10 or 11 in embodiment 30, transversely located, integrally formed, upstanding sidewall portions 54 and 55 (paired) are provided for respective trough section 19 and 20 which function to support the central hemicylindrical portions thereof. These sidewall portions 54 and 55 preferably incorporate (as shown) generally vertically extending channels, such as the exemplary channel 56 in sidewall 54 (see FIG. 6). The walls defining each such channel 56 can be formed by any convenient material such as sheet metal, glass filled polyester sheeting, or the like, but such are configured to permit extension therethrough of a support column 58 formed of wood, steel, or the like. Thus, a plurality of support columns 58 can be employed, each of which is thus in a fixed, vertical relationship relative to the sidewall portions 54 and 55. The individual effective length of each support column 58 is preferably prechosen since conveniently and preferably, as in the embodiment shown, the upper end of each individual support column 58 abuts up against the interior of the shelf joining the hemicylindrical portion with each sidewall portion in each respective trough section, such as section 10 or 11. Thus, if desired, and as illustrated, for example, in FIG. 5, a modular rotating biological contactor apparatus, such as embodiment 30, optionally can be made to upstand from a floor or ground underlying region.

Embodiment 30, as those skilled in art will appreciate, is, in operation, conveniently charged with wastewater to an apparatus fill level that is not more than sufficient to achieve approximately a 40% coverage of the contactor disk diameter of the individual disks of a contactor 25 or 26, as shown, for illustrative purposes, by the horizontal line 59 seen in FIG. 5. Thus, in operation, the bearings 34 in embodiment 30 are maintained out of continuous contact with the water of a wastewater medium being treated with apparatus of this invention.

The operating conditions for rotating biological contactor systems which are known to the prior art (see, for example, the work by Grady and Lim hereinabove cited) can be adapted for use in operating embodiments of the present invention, as those skilled in the art will readily appreciate, so such do not as such constitute a part of the present invention. For example, typical contactor rotational speeds may range from about 0.5 to 12 rpm so as to provide a circumferential contactor peripheral or edge speed of approximately one foot per second. For another example, through-put rates of wastewater are dependent upon many variables, such as the size and treating capacity of an individual apparatus embodiment, the nature and structure of the contactor assembly used, stage sizes, and other variables. Conventionally, soluble BOD loadings are less than about 4 pounds per 1,000 square foot of contactor media surface area.

To operate an embodiment 30, certain conventional auxillary equipment is conventionally employed, as those skilled in the art will readily appreciate. Thus, for example, wastewater to be treated with the embodiment 30 is preliminary charged into a pretreating device, such as settling tank 61, or the like, for preliminary removal of particulate solids by settling, filtering or the like, as desired. From the settling tank 61, liquid is transported through a conduit 62 to the input pipe 37. It is preferred to employ a pump 63 in order to control and meter a regulated amount of input fluid into the first unit 10. The throughput volume of fluid passing through the stages comprising the entire embodiment 30 is likewise in effect determined by the pumping rate associated with the pump 63.

From the foregoing exemplary information it will be appreciated that a modular rotating biological contactor apparatus of the present invention can employ at least two hemicylindrical trough sections. No practical limit on the maximum number of such sections is believed to exist but typically the number of sections employed in any given embodiment of the present invention will usually be less than 8 or 10. In any given embodiment, all of the trough sections have inside walls with generally similar diametrical and circumferential dimensions. All trough sections are oriented in a given assembled contactor apparatus relative to one another so as generally to have a common longitudinal axes. Individual trough sections are generally in a proximate relationship to one another relative to longitudinally adjacent others thereof.

Each trough section has associated means for independently supporting such relative to an underlying ground surface preferably in an orientation such that the longitudinal axis in the assembled contactor apparatus is generally horizontal.

Bulkhead means is located between each adjacent pair of trough sections in an assembled contactor apparatus and such bulkhead means includes mounting means for engaging the bulkhead means with the adjacent pairs of trough sections preferably in a fluid tight engagement. For reasons of controlling and regulating flow of wastewater through a bulkhead means, an aperture means is defined in each of the bulkhead means.

A pair of end bulkheads or endplate means are provided, and each one of said pair is located across a different opposed end of the terminal pair of trough sections. Each endplate means includes mounting means for engaging the endplate means with the adjacent opposed end of the trough section preferably in a fluid tight engagement. Also, aperture means is provided in each endplate means for achieving fluid passage therethrough.

For operational purposes, fluid contact means is associated with the respective such aperture means of each one of such pair of endplate means. Thus, wastewater can be input into a first chamber of a series of sequential chambers located along the common longitudinal axis. Each of the chambers is defined by the resulting assembly of the trough sections, the bulkhead means, and the endplate means. Treated wastewater is removed from the final chamber of such series through suitable fluid contact means associated with the aperture means in the terminal endplate means.

In each one of the chambers of such series a rotatable contactor means is preferably suspended so that the edge portions of the contactor means are in an adjacent but diametrically spaced relationship to be circumferentially extending inside wall portions of the hemicylindrical trough sections. All of the contactor means are mounted upon an assocated common shaft means. Bearing means is provided for the shaft means and the bearing means is supported by the bulkhead means and the endplate means. The shaft means is generally coaxial with the longitudinal axis. A powerhead is provided for rotatably driving the shaft means. Preferably, the powerhead is adjacent one of the endplate pairs and is conveniently supported thereby. Hence, all contactor means are simultaneously rotatable.

In one preferred embodiment of the invention, the shaft means is comprised of a plurality of interengaged shaft segments. Each shaft segment is suspended in and associated with a different one of the hemicylindrical trough sections. Each shaft segment has a length which is about equal to the longitudinal length of the respective associated trough section. The respective opposed end portions of each shaft segment are supported by the bearing means and such respective opposed end portions of each shaft segment are adapted for engaging the adjacent end portion of the respective adjacent shaft segments. Preferably the shaft means or shaft segments have a cross-sectionally square configuration in regions thereof whereover the contactor assembly is mounted which is advantageous because typically the contactor structure is fabricated of soft materials which are relatively easy to fracture, distort, or the like as those skilled in the art will appreciate.

While all of the trough section utilized in a single apparatus embodiment can have the same axial length, it is preferred presently to use at least two different trough sections in a given rotating biological contactor apparatus of this invention wherein the trough sections differ from one another in longitudinal length.

Preferably the trough sections, the bulkheads, and the endplate, respectively, are each characterized by having integral one-piece structures (preformed). It is presently preferred to have the trough sections, the baffle plates, and the endplates comprised of a reinforced molded resin. One presently preferred resin comprises a glass-reinforced polyester resin. Preferably, the bulkheads and the endplates include integrally formed bearing support means. In one presently preferred form of hemicylindrical trough section, supporting means is employed which is generally bilaterally symmetrical and includes upstanding leg members which are functionally associated with longitudinally extending frame means. Here, the hemicylindrical trough section is conveniently suspended from the longitudinally extending frame means along its longitudinally opposed side edge portions, as shown in the drawings. Preferably, and as shown, the supporting means further includes reinforcing frame members, particularly for relatively large sized embodiments, which circumferentially extend around predetermined exterior portions of each hemicylindrical trough section, thereby to better support such section in operation when wastewater is present.

Figure 8:
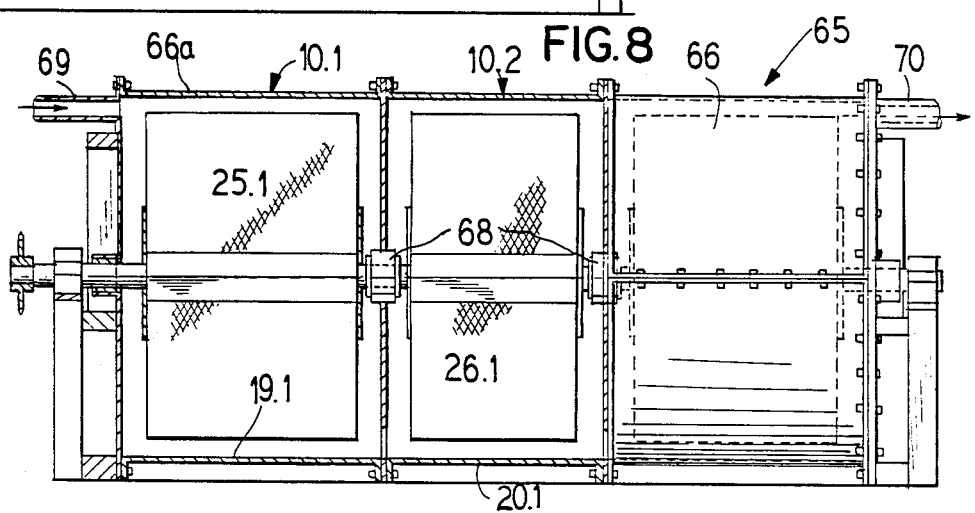
FIG. 8 is a view but showing an alternative embodiment of apparatus of the present invention wherein the right side is shown in side elevation and the central and left side is shown in longitudinal section.
Figure 7:
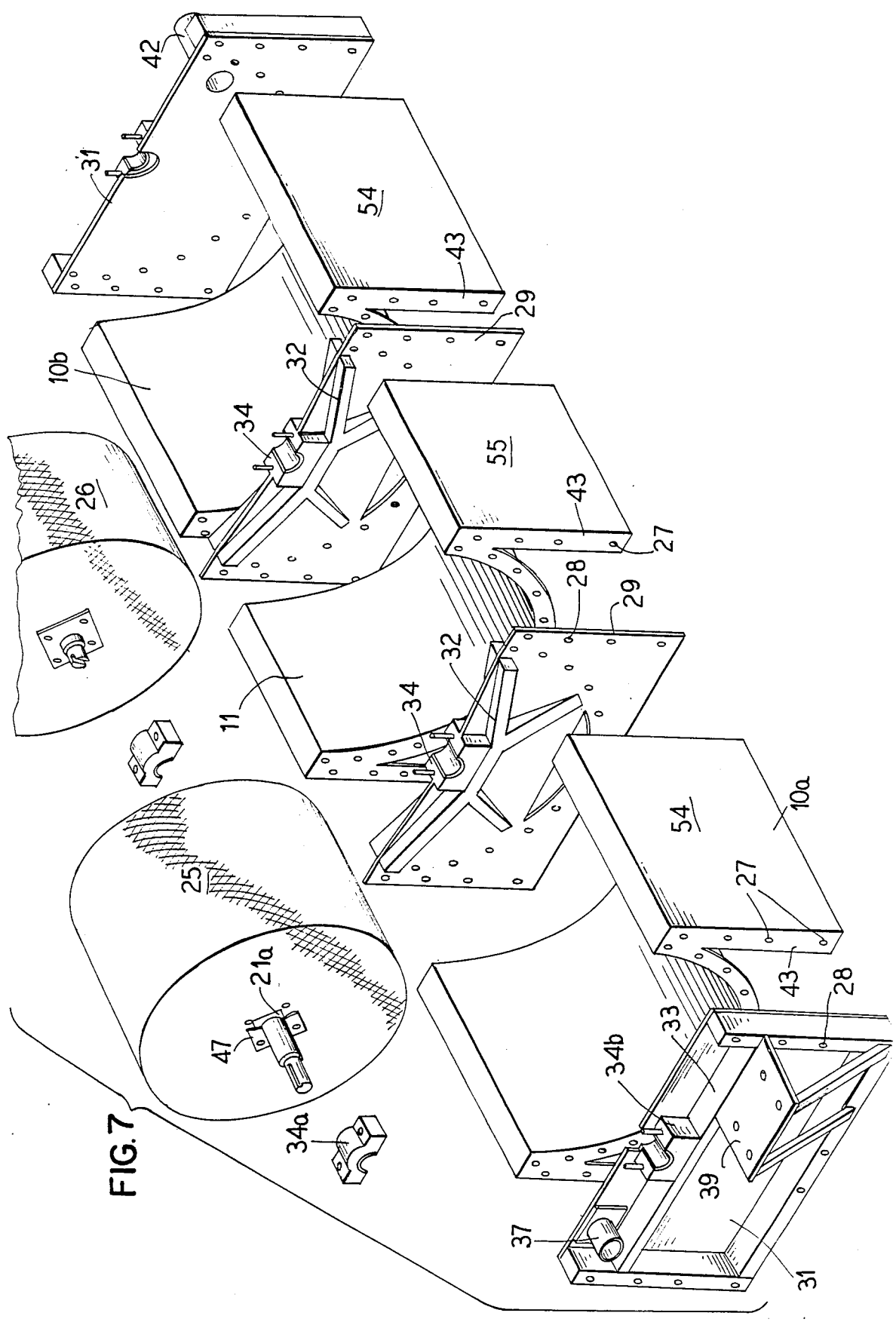
FIG. 7 is an exploded perspective view of the apparatus of FIG. 1.

Shown in FIG. 8 is an alternative embodiment 65 of modular apparatus of the present invention wherein wastewater treatment is accomplishable, if desired, as those skilled in the art will appreciate, anaerobically, as distinct from aerobically, such as accomplishable by the embodiment 30 (as shown in FIGS. 1-7) Embodiment 65 is similar in structure to embodiment 30. Components in embodiment 65 which are similar to components in embodiment 30 are similarly numbered, but with the addition of decimal numbers thereto. In embodiment 65, the entire circumferential surface portions of each individual modular unit, such as trough sections 10.1 and 10.2 are each covered by a removable hood member 66a and 66b, while the trough section 11 is provided with a removable hood member 68. Each hood member is in preferably a fluid (water) tight engagement with the individual (lower) trough sections, such as 19.1 and 20.1. A plastic sealant (not shown) may be used if desired for achieving a fluid tight engagement as those skilled in the art will appreciate. Also, the bearing blocks here employed are sealed so as to permit their immersion into, and use in, an aqueous environment. Thus, the embodiment 65 is adapted to be substantially completly filled with a wastewater composition for treatment. With such an apparatus configuration, there is substantially no atmospheric oxygenation of the individual contactors 26.1 and 25.1 during wastewater treatment. In embodiment 65, the input and output water streams are exemplarily located in a top portion of each of the opposed endplates. Thus, an input pipe 69 and an output pipe 70 are provided in functional association therewith.

Figure 10:
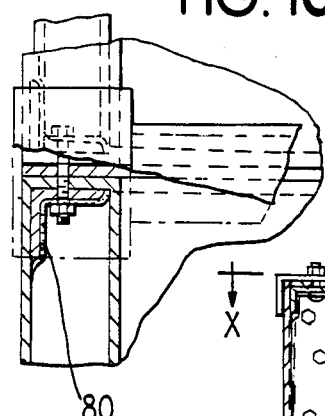
FIG. 10 is a view similar to FIG. 6, but taken along the line X—X of FIG. 9.
Figure 9:
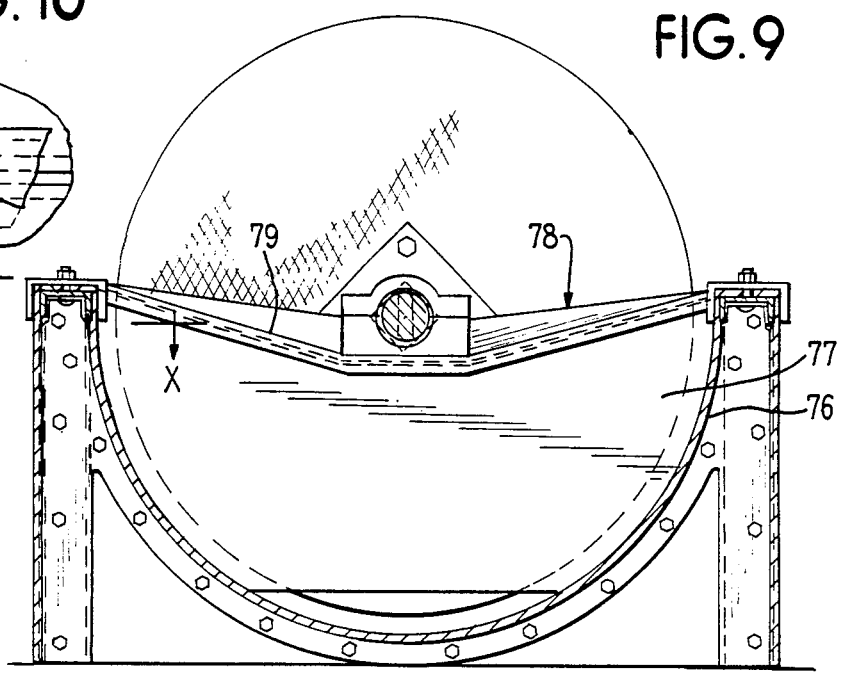
FIG. 9 is a view similar to FIG. 5 but showing a further alternative embodiment of the present invention.
Figure 11:
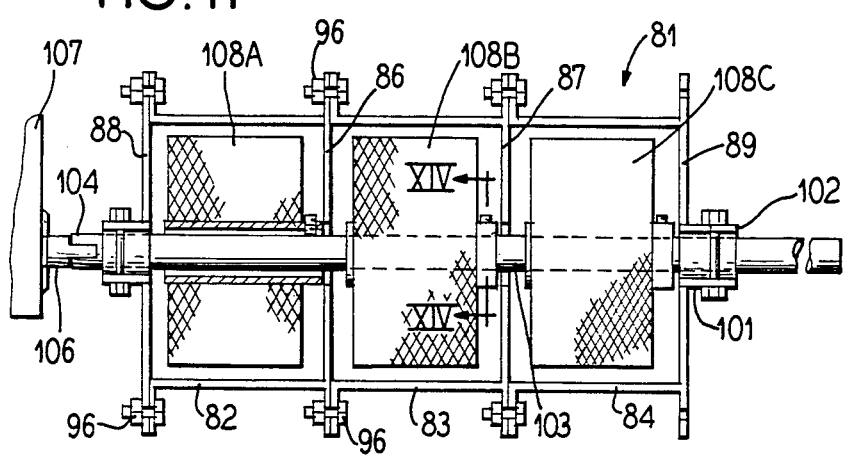
FIG. 11 is a view similar to FIG. 1, but showing an alternative embodiment of a modular rotating biological contactor apparatus of the present invention.

Referring to FIGS. 9 and 10, there is seen a further embodiment 75 of a modular rotating biological contactor apparatus of the present invention. The embodiment 75 is believed to be particularly well suited for relatively large-sized installations, which can be typically larger in size, for example, than the size of installations fabricated in accordance with the foregoing description and drawings concerning embodiment 30. For example, embodiment 75 may range from about 6 to 20 feet in the inside diameter of the hemicylindrical trough sections. Here steel structural members can be combined with plastic members to achieve integrally formed trough sections, bulkheads, and endplates. For example, if desired, the trough sections 76 and the bulkheads 77 can be generally fabricated of glass filled polyester resin and the steel support members can be integrally formed and integrated with such polyester resin portions so as to produce strong, durable, rust proof stationary structures with high load bearing capabilities. A hammock-like frame arrangment is preferably employed in each bulkhead. Thus, a steel truss arrangement designated in its entirety by the numeral 79 is provided for integral association with the top edge. Lateral side edge portions of each such truss arrangement 79 mount in a nesting manner over the opposite sidewall portions of the trough sections 76. Thus, the weight of the assembly of contactors and shaft means is essentially borne by the lateral side edge portions of the trough sections. Such side edge portions may be reinforced with angle iron members, or the like, as shown. In this structural arrangement, the individual bulkheads 77 merely serve as dividers, or separators, for the individual modular units which are in adjacent coaxial relationship one to another. Thus, generally for equal perimeter sizes, the individual bulkheads 77 of embodiment 75 can, if desired, be made of substantially less plastic material than is employable in a structure such as is associated with the bulkheads employed in the embodiment 30 which is advantageous in order to minimize material costs when relatively large sized apparatus embodiments are desired utilizing the teachings of the present invention. The liquid fill levels on each side of, for example, a bulkhead 77 are equalized so no dynamic forces are exerted selectlvely upon one side of the bulkhead. The liquid level in adjacent units is substantially equal during apparatus operation.

Referring to FIGS. 11–14, there is seen another embodiment of the present invention designated in its entirety by the numeral 81 and which is seen illustratively to utilize three hemicylindrical trough sections 82, 83, and 84, two bulkheads 86 and 87 and two endplates 88 and 89.

Figure 12:
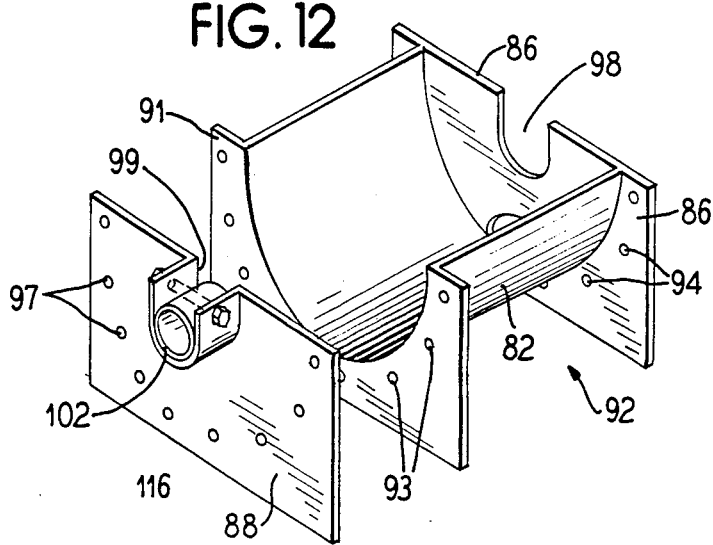
FIG. 12 is an exploded perspective view of some portions of the apparatus of FIG. 11.
Figure 13:
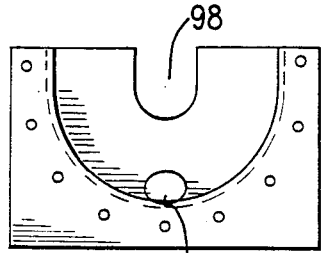
FIG. 13 is an end elevational view of the trough section shown in FIG. 12, with the end plate removed.

Each hemicylindrical trough section, for example, section 82 in FIG. 12, is fabricated, for example, of a thermoset plastic, such as glass-filled polyester resin, or a metal such as sheet metal, or the like. Each trough section is integrally formed or associated with a bulkhead, here, for example, bulkhead 86 which is across one end thereof as shown. Also, each trough section has its opposed end open but integrally associated with an integrally formed or associated supporting plate 91. Conveniently, supporting plate 91 and bulkhead 82 each upstand and are substantially in spaced, parallel relationship to one another.

A preformed assembly of hemicylindrical trough section 82, bulkhead 86 and supporting plate 91 thus provides a modular unit 92 suitable for use in the fabrication and assembly of modular rotating biologioal contactor apparatus 81. Thus, to assemble such a modular unit 92 to another similarly configured modular unit 92, the respective pair of modular units are aligned so that the supporting plate 91 abuts against the bulkhead 86 of the adjacent modular unit. Apertures 93 (plurality) formed in supporting plate 91 are located so as to be alignable with similar apertures 97 in plate 88 so that the nut and bolt assemblies 96 (FIG. 11) engage the endplate 88 with the supporting plate 91. An axially located (relative to trough sections 82, 83 and 84) notch 98 is preformed in each of the bulkheads 86, and a correspondingly aligned notch 99 is similarly provided in the endplate 88. An out-turned flange 101 is associated with the respective notches 98 and 99 in opposing plate 88 and plate 86 of the embodiment 81, thereby to provide respective seats for a pair of sleeve bearings 102 (or the like) which are adapted for rotationally mounting a shaft 103 coaxially with the longitudinal axis of the assembly 81. In embodiment 81, the shaft 103 is illustratively a single member which is illustratively cross-sectionally round, and one end 104 of shaft 103 is here provided with a diametrically extending notch as an illustration means for engaging the shaft 103 with a matingly engagable drive shaft 106 of a powerhead 107 (conventional and not detailed). Any convenient powerhead association means can be used.

A generally cylindrically configured contactor arrangement 108A, 108B, and 108C is positioned in diametrically spaced adjacent relationship to each of the hemicylindrical trough sections 82, 83 and 84, respectively, with the contactors 108A, 108B, and 108C being supported in fixed relationship to the shaft 103.

Figure 14:
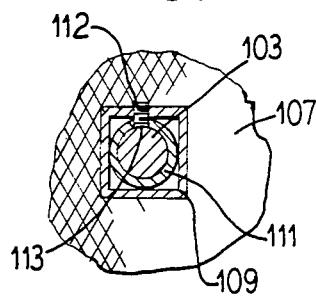
FIG. 14 is an enlarged, fragmentary detail view taken along the line XIV—XIV of FIG. 11.

Thus, to associate the contractor for example, contactor 108B with the shaft 103, a cross-sectionally square sleeve 109 extends axially through contactor 108B and is secured to adjacent side portions of the contactor by an adhesive (not shown) or the like. The internal dimensions of the sleeve 109 are such that it can be slidably engaged over the cylindrical surfaces of the shaft 103. A clamping ring 111 is slidably fitted over the shaft 103 and is used to clamp the contactor, here contactor 108B, to the shaft 103 by means of a set-screw 112 or the like which is received key-like into a groove 113, flattened region or the like extending longitudinally along the surface of the shaft 103, all as shown in FIG. 14.

The modular unit 92 thus utilizes the bulkhead 86 both as a partitioning means between adjacent hemicylindrical trough sections, and also as a support means for holding and positioning a hemicylidrical trough section in a desired horizontal configuration.

An aperture 114 formed in the bottom region of each bulkhead 86 adjacent inside wall surfaces of the trough sections is provided for fluid passage, and a similar aperture 116 is provided in endplate 88.

Those skilled in the art will appreciate that the apparatus of this invention can employ for powering the rotation of the contactor any desired or suitable means, including adapted known air drives in which case the individual stages can have separate disassociated (relative to each other) shaft rotations.

As is apparent from the foregoing specification, the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. An improved modular rotating biological contactor apparatus comprising in combination:
   (A) at least two hemicylindrical trough sections, all said trough sections having inside walls with generally similar diametrical and circumferential dimensions, and all being oriented relative to one another so as generally to have a common longitudinal axis, and each said trough section being generally in a proximate relationship relative to longitudinally adjacent others thereof,
   (B) a bulkhead means located between each adjacent pair of said trough sections, said bulkhead means including mounting means for engaging said bulkhead means with said adjacent pair of said trough sections in a generally fluid tight engagement and further including aperture means defined in each said bulkhead means for achieving fluid passage therethrough,
   (C) a pair of endplate means each one disposed across a different opposed end of the terminal pair of said trough sections, each said endplate means including mounting means for engaging said endplate means with a different one of said opposed ends in a generally fluid tight engagement, and further including aperture means defined therein for achieving fluid passage therethrough,
   (D) fluid conduit means associated with the respective said aperture means of each one of said pair of endplate means for inputting fluid into a first chamber of a series of sequential chambers defined by the resulting assembly of said trough sections, said bulkhead means and said endplate means, and for removing fluid from a final chamber of said series,
   (E) rotatable contactor means suspended in each one of said chambers in adjacent but diametrically spaced relationship to said inside walls, all said contactor means including an associated shaft means mounting said contactor means, and bearing means for so suspending said shaft means, supported by said bulkhead means and said endplate means, said shaft means being generally coaxial with said axis,
   (F) drive means for rotatably driving said shaft means, whereby said contactor means is rotatable, and
   (G) support means associated with at least one of said hemicylindrical trough sections, said bulkhead means, and said endplate means for independently supporting said rotating biological contactor apparatus relative to an underlying ground surface in an orientation such that said axis is generally horizontal.

2. The apparatus of claim 1 wherein said shaft means is comprised of a plurality of interengaged shaft segments, each said shaft segment being so suspended in a different one of said trough sections, and each said shaft segment having a length at least about equal to the longitudinal length of the respective individual one of said trough sections wherever each said shaft segment is so suspended, the respective opposed end portions of each such shaft segment include means for engaging such shaft segment with the end portions of adjacent other shaft segments of said shaft means.

3. The apparatus of claim 1 wherein all said trough sections are classifiable into at least two groups wherein the members of each group are generally similar to one another, and wherein the longitudinal length of the members in each such group differs from the longitudinal lengths of the respective members in all other said groups.

4. The apparatus of claim 1 wherein each of said trough sections, said bulkhead means, and said endplate means respectively, is characterized by having an integral one-piece preformed structure.

5. The apparatus of claim 4 wherein said trough sections, said baffle plate means, and said endplates are comprised of a reinforced molded resin.

6. The apparatus of claim 4 wherein said resin comprises a glass reinforced polyester resin.

7. The apparatus of claim 4 wherein said bulkhead means and said endplate means each include bearing support means.

8. The apparatus of claim 1 wherein, in each of said trough sections, said supporting means is generally bilaterally symmetrical and includes upstanding leg means which are functionally associated with longitudinally extending frame means from which said hemicylindrical trough section is generally suspended and supported along its longitudinal opposing side edge portions.

9. The apparatus of claim 8 wherein said supporting means further includes reinforcing frame members which circumferentially extend around predetermined exterior surface portions of said hemicylindrical trough section.

10. The apparatus of claim 1 wherein, in each of said trough sections, (a) a bulkhead means is permanently affixed to each opposed axial end of each hemicylindrical trough, (b) said supporting means and said bulkhead means are integrally formed, (c) successive adjacent trough sections are associated together by engaging together adjacent ones of said baffle plates by said mounting means, and (d) each of said endplates is engaged with a different one of the respective bulkhead means located at each opposing end of said series.

11. The apparatus of claim 1 wherein said support means is integrally associated with said hemicylindrical trough sections.

12. The apparatus of claim 1 wherein said support means is integrally associated with both said bulkhead means and said endplate means.

13. A coacting combination of components which are assemblable in a plurality of ways to provide a tankage assembly for a rotating biological contactor apparatus, said tankage assembly being characterized by having at least two generally coaxial chambers in longitudinally adjacent relationship to one another, each said chamber having generally hemicylindrical side walls with generally similar diametrical and circumferential dimensions, and further having generally flat end walls which are generally in spaced, parallel relationship to one another, said tankage assembly being comprised of:
   (A) at least two hemicylindrical trough sections, all said trough sections having inside walls with generally similar diametrical and circumferential dimensions, and all being oriented relative to one another so as generally to have a common longitudinal axis, and each said trough section being generally in a proximate relationship relative to longitudinally adjacent others thereof, (B) a bulkhead means located adjacently between each adjacent pair of said trough sections, said bulkhead means including mounting means for engaging said bulkhead means with said adjacent pair of said trough sections in a generally fluid tight engagement and further including aperture means defined in each said bulkhead means for achieving fluid passage therethrough, (C) a pair of endplate means each one disposed adjacently across a different opposed end of the terminal pair of said trough sections, each said endplate means including mounting means for engaging said endplate means with a different one of said opposed ends in a generally fluid tight engagement, and further including aperture means defined therein for achieving fluid passage therethrough, (D) support means integrally associated with at least one of said hemicylindrical trough sections, said bulkhead means, and said endplate means for independently supporting said tankage assembly relative to an underlying ground surface in an orientation such that said axis is generally horizontal.

* * * * *